Feb. 12, 1946.   M. P. MATUSZAK   2,394,929
CATALYTIC ALKYLATION PROCESS
Filed March 3, 1942
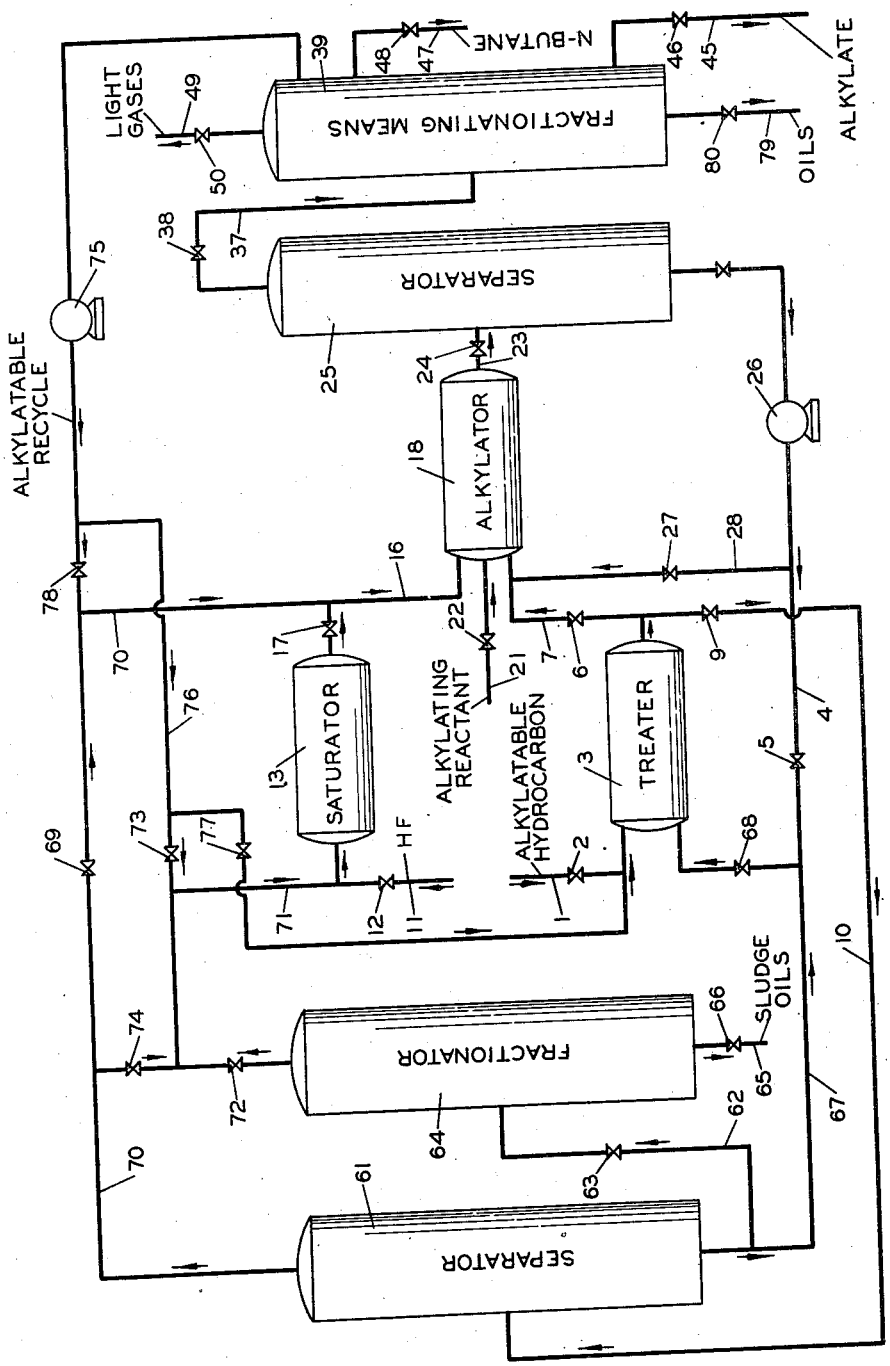
INVENTOR
MARYAN P. MATUSZAK
BY *Hudson, Young & Yinger*
ATTORNEY Patented Feb. 12, 1946

2,394,929

UNITED STATES PATENT OFFICE 2,394,929

CATALYTIC ALKYLATION PROCESS

Maryan P. Matuszak, Bartlesville, Okla., assignor to Phillips Petroleum Company, a corporation of Delaware Application March 3, 1942, Serial No. 433,198

2 Claims. (Cl. 260—683.4)

This invention relates to a process for the catalytic alkylation of hydrocarbons, and more particularly to improvements in the alkylation of hydrocarbons in the presence of hydrofluoric acid. This application is a continuation-in-part of my copending application, Serial No. 404,395, filed July 28, 1941.

In the presence of suitable catalysts alkylatable hydrocarbons, such as paraffins, aromatics, and naphthenes, react with unsaturated hydrocarbons or other alkylating reactants to form higher-boiling alkyl derivatives. Thus propylene can be used as an alkylating reactant with isobutane to give isoheptanes, with benzene to give propylbenzene, and with cyclohexane to give propylcyclohexane. The alkylation is promoted especially well by hydrofluoric acid. This catalyst yields best results with aromatics and isoparaffins, or paraffins having at least one tertiary carbon atom per molecule, and with olefins having more than two carbon atoms per molecule; however, under especially favorable conditions, other paraffins, such as normal butane and normal pentane, and/or other olefins may react. Suitable alkylating reactants include olefins, alkyl compounds, advantageously relatively polar nonprimary alkyl compounds, such as tertiary and secondary alcohols and alkyl halides, preferably fluorides and chlorides, and the like. The hydrofluoric acid preferably should be above about 80 per cent in strength: it is most efficient when it has a concentration of 95 per cent or more, and may be anhydrous or 100 per cent in strength.

Because of its nonoxidizing character, hydrofluoric acid does not produce oxidation by-products such as those formed in alkylation with catalysts of the type of sulfuric acid. Furthermore, it is relatively free of the tendency to form complex tarry addition products such as those formed in alkylation with certain other well-known catalysts, such as the halides of some polyvalent metals. However, because use of it in the past has been comparatively small, its properties and behavior, especially in mixtures with aliphatic hydrocarbons, are still comparatively unfamiliar.

In accordance with one aspect of the process disclosed in the aforementioned copending application that is considered to be especially useful for continuous alkylation of paraffins in the presence of hydrofluoric acid, the liquid hydrofluoric acid is saturated with the paraffin to be alkylated prior to introduction of it into the reaction zone. This improvement in the art of alkylation takes advantage of the discovery that paraffins and hydrofluoric acid are mutually soluble in each other in the liquid state to a considerable extent, and much more so than are paraffins and such alkylation catalysts as sulfuric acid. The resulting presaturated acid contains in solution the maximum of dissolved alkylatable paraffin, thereby making maximal the concentration of one of the two principal reactants in the liquid phase in which the alkylation reaction occurs. Because the acid is fully saturated with the paraffin from the very beginning of its coming into contact with the alkylating agent present in, or simultaneously introduced into, the reaction zone, the opportunity for favorable association or conjunction of paraffin and alkylating agent, resulting in the desired alkylation, is enhanced; at the same time, the opportunity for the alkylating agent to undergo undesirable side reactions, such as those that result in the formation of heavy polymers and/or heavy fluorine-containing compounds, is minimized. Similarly, the paraffin fed to the reaction zone may be advantageously presaturated with hydrofluoric acid, whereby acid withdrawn from the reaction zone in solution in the hydrocarbon effluent is replaced by the acid carried in solution in the paraffins, so that maintaining of the amount of acid in the reaction zone at a desired value is greatly facilitated. Such saturation of materials before their passage to the alkylation zone is especially desirable when the contact time in this zone is relatively low, such as one half to two minutes.

The hydrofluoric acid used as catalyst for alkylation processes gradually becomes spent or deactivated to such a degree that it is no longer suited for continued use as an alkylation catalyst. Hence, during alkylation, a portion of the acid is usually withdrawn continuously or intermittently from the alkylation step and is purified or recovered by means such as fractional distillation and/or thermal decomposition of the resulting distillation residue to split out organically combined fluorine as hydrogen fluoride. The acid consumption varies widely with the nature and purity of the feed and with the operating conditions, especially the temperature; it generally increases with increase in temperature.

An object of this invention is to provide an improved process for alkylating hydrocarbons in the presence of hydrofluoric acid to produce normally liquid hydrocarbons suitable for use in motor fuel.

Another object is to prolong the active life of hydrofluoric acid used as catalyst in an alkylation process.

Another object is to reactivate or purify partially hydrofluoric acid previously used as a catalyst in an alkylation step, and simultaneously to saturate with hydrofluoric acid an alkylatable hydrocarbon to be alkylated in the alkylation step.

Other objects and advantages of this invention will be apparent from the accompanying description and discussion.

For the sake of simplicity, the description may be devoted primarily to the alkylation of paraffins, since paraffins constitute the greatest present source of alkylatable hydrocarbons suitable for conversion to motor-fuel hydrocarbons. However, it will be understood that other alkylatable hydrocarbons, such as aromatic and/or naphthenic hydrocarbons, preferably those free from unsaturated side chains, may be used instead of paraffins, under substantially the same conditions, and that, if desired, hydrocarbon products boiling above the motor-fuel range may be made by the present process.

In accordance with one aspect of the present invention, an alkylatable hydrocarbon is intimately contacted, in the absence of an added alkylating reactant, with used hydrofluoric acid from an alkylation step. The alkylatable hydrocarbon usually is a low-boiling and substantially olefin-free paraffin, preferably an isoparaffin of four to five carbon atoms per molecule, which is to be used as feed to the alkylation step. By this treatment the paraffin alkylation feed is saturated with acid; and the used acid is partly purified or reactivated, thereby increasing the catalyst life, substantially reducing the acid consumption, and decreasing the load on acid-recovery steps. Although the mechanism of the beneficial effect of the treatment on the used acid is not well understood, the effect appears to be due to a reaction of the isoparaffin with acid-soluble material in the acid; probably the acid-soluble material is converted either to acid-insoluble material or to inert material which is relatively nondeleterious to the catalyst.

The intimate contacting of the alkylatable hydrocarbon and the used hydrofluoric acid preferably is effected immediately subsequent to separation of the acid from the hydrocarbon effluent from the alkylation step. Undue delay in effecting the contacting produces undesirable chemical changes in the acid-soluble organic material contained in the acid, whereby this material not only becomes relatively resistant to reaction with the alkylatable hydrocarbon but also produces heavy nonreactive carbonaceous compounds, some of which are exceptionally high in fluorine content; consequently, contacting within half an hour after the separation is advisable, and preferably within 5 minutes or less.

Some aspects of this invention may be described most readily with reference to the accompanying drawing, which illustrates in schematic form one specific embodiment that is especially well suited for the alkylation of a low-boiling isoparaffin, such as isobutane or isopentane, in the presence of hydrofluoric acid. Similar procedures can be used with other alkylatable hydrocarbons.

A low-boiling paraffinic material, preferably isobutane, enters the system by inlet 1 having control valve 2 and opening into treater 3. Simultaneously used hydrofluoric acid from the alkylation step (which is described hereinafter) enters treater 3 through valve 68 from conduit 4 having control valve 5. In treater 3 intimate mixing and contacting of isobutane and used acid is effected, whereby the isobutane phase becomes saturated with hydrofluoric acid, and the hydrofluoric acid is "reactivated" to an appreciable extent. Although the exact nature of the reactivation is not known, it is thought that in the absence of appreciable proportions of reactive materials such as alkylating agents part of the acid-soluble material in the used acid is converted, by reacting with isobutane, to compounds that are insoluble in the acid or that have relatively nondeactivating characteristics; presumably at least part of the resulting compounds are motor-fuel hydrocarbons that may augment the yield of motor-fuel hydrocarbons produced in the alkylation step. In practice, this advantageous effect decreases the over-all consumption of hydrofluoric acid and also the load on acid-recovery equipment.

Treater 3 may comprise any suitable means for effecting intimate mixing and/or emulsification of a low-boiling isoparaffin such as isobutane with hydrofluoric acid; it may be a standard mixer having a mechanical stirrer, or it may be an arrangement of piping and/or jets wherewith turbulence is maintained by high fluid velocities. Treater 3 is preferably operated at atmospheric temperature, though at times somewhat higher or lower temperatures are advantageous and may be used. The pressure should be sufficient to maintain the mixture in the liquid phase. The treating time is not highly critical; usually a time in the range of from about five minutes to about two hours is suitable; the time required for any particular case usually decreases with increase in temperature, and the optimum time for a selected set of conditions may be readily found by trial. However, the treating time generally must be longer than the time of contact in the alkylation step, since the reactivation reaction is considerably slower than the alkylation reaction; for this reason, the treating time must usually be at least twice as long as the time of contact in the alkylation step, and preferably it is from five to ten times as long.

The effluent mixture of acid and hydrocarbon from treater 3 may be transferred through valve 6 and conduit 7 directly to alkylator 18; this procedure is used when treater 3 is large enough to effect sufficient improvement of the acid by concurrent contacting of it with the alkylatable hydrocarbon, and the time of contact is long enough to maintain the intimate contacting for a period at least twice as long as the time of contact subsequently prevailing in the alkylation step. Usually, however, most of the effluent mixture is passed through valve 9 and conduit 10 to separator 61, wherein it is separated into two liquid phases by gravity or centrifugation, accompanied or preceded if desired by cooling. A minor part of the heavier or hydrofluoric acid phase is passed through conduit 62 having valve 63 to fractionator 64, wherein it is further purified by being distilled from acid-deactivating material not removed by reaction in treater 3; the undesired residue is withdrawn through outlet 65 having valve 66. The major part of the heavy or acid phase from separator 61 is recycled to treater 3 through conduit 67 having valve 68; by this recycling, the average treating time of the acid is increased to any desired extent without necessitating an undue increase in the size of treater 3. Alternatively, treater 3 may be designed for effecting a countercurrent contacting of the acid and the alkylatable hydrocarbon, as for example in a tower in which the hydrocarbon rises through down-flowing acid; but such countercurrent contacting requires an uneconomically large size for the treater and in practice effects relatively unsatisfactory results because the opportunity for effecting really fine subdivision of the two liquid phases and obtaining intimate contacting is not as good as in a mechanical mixer of the concurrent type, which accordingly is preferred. The lighter of hydrocarbon phase from separator 61 is transferred through valve 69 and conduit 70 to alkylator 18.

Fresh or make-up acid and/or recycle acid from fractionator 64 enters saturator 13 through inlet 11 and valve 12 and/or conduit 71 and valve 72, respectively. Simultaneously, sufficient isobutane or other paraffinic alkylation-feed material enters saturator 13 through valve 73 and/or valve 74 in a proportion at least sufficiently large to effect saturation of the hydrofluoric acid. The minimum amount of paraffin required to saturate the acid depends somewhat upon the temperature, for the solubility of the paraffin in hydrofluoric acid increases with increase in temperature; for example, the solubility of isobutane increases from 1.8 per cent by weight at 32° F. to 4.0 per cent at 140° F. Because of this effect of temperature upon the solubility, it is desirable to use about as high a temperature in saturator 13 as that to be used in the subsequent alkylation step; a temperature in the range of 70 to 130° F. is usually preferred, but good results are obtained at temperatures below and above this range. Moreover, it is desirable to feed to saturator 13 an excess of the isoparaffin sufficient to form an emulsion containing both a hydrofluoric acid liquid phase and a paraffin liquid phase, whereby saturation of the acid phase with the paraffin is both expedited and ensured. Saturator 13 may be a vessel having a mechanical stirrer, a baffled pipe, or other suitable means for effecting intimate contacting of the acid and hydrocarbon. The resulting mixture, solution, or emulsion is transferred through conduit 16 having valve 17 to alkylator 18.

In alkylator 18 the acid-and-paraffin mixture is subjected to such alkylation conditions that the paraffin reacts with an alkylating reactant, such as an olefin, alcohol, alkyl halide, or the like, usually having 3 to 5 carbon atoms per molecule, which may be introduced through one or more inlets, such as inlet 21 having valve 22.

The reaction conditions in alkylator 18 may vary widely, but they preferably are so selected as to favor alkylation and to minimize side-reactions such as those producing relatively heavy unsaturated hydrocarbons and/or fluorine-containing compounds. To this end, the instantaneous concentration of alkylating reactant in the reaction mixture should be low, so that the isoparaffin is always in great excess. Although a saturated product can be obtained when the mol ratio of isoparaffin to alkylating reactant is 1:1, in general, the most desirable results are obtained when the mol ratio of isoparaffins to alkylating reactant at the immediate zone of addition of the alkylating agent is not less than about 9:1. However, when particularly pure hydrocarbon products, or a motor-fuel stock of particularly high octane number, are desired, the mol ratio of iso-paraffin to alkylating reactant may need to be as high as 50:1 or 100:1 for any particular point at which alkylating agent is introduced, but generally satisfactory conditions will be found when the mol ratio of isoparaffin to alkylating reactant is between 12:1 and 50:1. Accordingly, addition in successive small quantities of the alkylating reactant to the reaction zone is advantageous, as described in Frey 2,002,394. The ratio of hydrofluoric acid to reactants should be high enough for easy maintenance of a large acid surface, and preferably sufficient hydrofluoric acid is employed to form a separate liquid acid phase; a ratio between about 1:1 and 1:10 by liquid volume is generally satisfactory, but at times this range may be exceeded in either direction. The temperature may vary widely; a temperature in the range of 70 to 130° F. is preferred; if desired, a simple heat exchanger or a water-cooled heat-exchanger coil may be used to keep the temperature in this range, but no special or elaborate refrigeration is necessary. The reaction period or time of contact of the reactants with the hydrofluoric acid may vary from one-half minute or less to one hour or more, depending somewhat on the temperature; a time of contact of one to forty minutes is generally satisfactory in the preferred temperature range. A high pressure may be used, but the pressure generally need not exceed that necessary to maintain the reactants in the liquid state. Intimate contacting of the reactants with the acid is desirable and may be effected by any suitable means, for example, by mechanical agitation, such as turbo-mixer agitation, which is preferred.

After a suitable reaction period, the reaction mixture is passed from alkylator 18 through conduit 23 having valve 24 to separator 25, in which it is separated, as by gravity or by centrifugation, into a hydrocarbon phase and a relatively dense acid phase. During the separation elevated temperatures should be avoided, since the mutual solubility of liquid hydrofluoric acid and hydrocarbons increases with increase in temperature; for example, in the range of 32 to 140° F., the solubility of hydrofluoric acid in isobutane increases substantially linearly from 0.3 to 0.9 per cent by weight; and the solubility of isobutane in hydrofluoric acid increases from 1.8 to 4.0 per cent by weight. For improved separation of the two phases, the temperature of separator 25 may be advantageously lowered somewhat below the range preferred for alkylator 18, preferably to a temperature in the range of about —40 to 50° F.

The liquid acid phase from separator 25 may be recycled, as by pump 26, through valve 27 and conduit 28 back to alkylator 18; preferably, however, since acid-soluble materials appear to be more susceptible to removal in treater 3 immediately after they are formed than afterwards, most or all of it is passed through valve 5 to treater 3.

The lighter or hydrocarbon phase from separator 25 is transferred through conduit 37 and valve 38 to fractionating means 39, wherein it is separated into the desired products, by-products, and recycle fractions. For example, a low-boiling fraction comprising relatively inert gases such as propane, lighter hydrocarbons, and some hydrogen fluoride may be withdrawn through outlet 49 having valve 50; if desired, this material may be treated, as in cooler and separator (not shown in the drawing), to condense and recover the hydrogen fluoride, which may be recycled to any appropriate step in the process. A fraction consisting predominantly of isobutane may be recycled by pump 75 through conduit 76 to treater 3 and saturator 13 in proportions determined by valves 77 and 73, respectively; if desired, part of it may also be recycled through valve 78 directly to alkylator 18. A fraction comprising normal butane may be withdrawn through outlet 47 having valve 48. A fraction comprising highly branched normally liquid hydrocarbons suitable for use in aviation gasoline may be withdrawn through outlet 45 having valve 46. A relatively small high-boiling fraction comprising oil and heavy by-products may be withdrawn through outlet 79 having valve 80.

A few of the many aspects of my invention are illustrated by the following example, which is illustrative but not necessarily limitative of the invention.

In a continuous arrangement similar to that illustrated in the accompanying drawing, isobutane and used hydrofluoric acid separated from the effluent of an alkylation step are agitated together at atmospheric temperature for an average period of about 25 minutes in a suitable mixing device. About two thirds of the resulting mixture is passed to a gravity separated, and the rest is passed as feed to an alkylator. A light or hydrocarbon phase from the separator is also passed to the alkylator. A heavy or acid phase is withdrawn from the separator and is recycled to the mixing device; a small part of it, however, is passed to an acid-fractionating column for purification. Fresh or make-up hydrofluoric acid, together with recycled purified acid from the acid-fractionating column, is saturated with isobutane in a small baffle-type mixer, and is passed to the alkylator. A mixture of butylenes is separately charged to the alkylator, preferably in a mixture with some additional isoparaffin. In the alkylator, the conditions are approximately as follows: temperature, 95 to 115° F.; pressure 125 to 200 pounds per square inch; reaction time, about 5 minutes; isobutane-to-butylene molal ratio (in the incoming materials), about 8; hydrocarbon-to-acid weight ratio, about 1; and rapid mixing to maintain intimate contact between the acid and the hydrocarbon phases.

The resulting effluent from the alkylator is separated by gravity into two liquid layers. The heavier or acid layer is recycled to the above-mentioned mixing device. The lighter or hydrocarbon layer is fractionated; the overhead fraction comprising chiefly isobutane and hydrofluoric acid, is recycled mostly to the above-mentioned mixing device and in part to the baffle-type mixer for saturating fresh acid with isobutane; the bottom fraction, comprising chiefly normally liquid hydrocarbons is passed to a rerun column.

In the rerun column, this fraction is distilled to yield an overhead fraction of aviation-range motor fuel hydrocarbons and a bottom fraction of higher-boiling hydrocarbons. The yield of motor-fuel hydrocarbons is about 195 per cent by weight of the butylenes charged to the alkylator. The motor-fuel product has an octane number of about 92 and is substantially completely saturated and paraffinic.

By this mode of practicing the invention, the acid consumption is generally decreased by about 10 per cent below that found for the same process without the treating step. In addition to this advantage, the yield of the desired product is increased, and the proportion of make-up acid that is necessary is decreased.

Numerous modifications of this invention will be obvious to those skilled in the art of hydrocarbon conversion. For example, the alkylation step may comprise several stages in series, operated with generally countercurrent flows of hydrocarbon and hydrofluoric acid in such manner that used acid from one stage is passed to another stage, and only the acid from the last stage of the series is subjected to treatment with isobutane in the absence of an added alkylating reactant.

Additional pumps, valves, conduits, coolers, fractionators, such as are well-known in the art of hydrocarbon conversion, may be used in any particular case wherever they are necessary or convenient for obtaining the results indicated. The scope of my invention should not be unduly limited by specific examples discussed hereinbefore, except as specified in the appended claims.

What is claimed is:

1. An improved process for the continuous alkylation of hydrocarbons in the presence of concentrated hydrofluoric acid as alkylation catalyst, which comprises intimately admixing in liquid phase in a pretreatment step a low boiling isoparaffin and only hydrofluoric acid separated from effluents of a subsequent alkylation step for a period of time sufficient to effect reaction between impurities in said hydrofluoric acid and said low boiling isoparaffin; passing at least a portion of the effluents of said pretreatment to a first separator and separating a hydrofluoric acid phase and a hydrocarbon phase, passing said hydrocarbon phase to an alkylation step and reacting same under alkylation conditions with an added alkylating reactant to form high boiling isoparaffins, in the presence of concentrated hydrofluoric acid as alkylation catalyst, passing effluents of said alkylation to a second separator and separating a hydrocarbon phase and a hydrofluoric acid phase, recovering from said hydrocarbon phase a hydrocarbon fraction containing high boiling isoparaffins so produced as a product of the process, passing all of the last said hydrofluoric phase to said pretreatment step, passing at least a portion of the first said hydrofluoric acid phase from said first separator to a fractional distillation step, recovering as a low boiling fraction substantially anhydrous hydrofluoric acid together with low-boiling paraffins dissolved in the hydrofluoric acid charged to said distillation step and passing same to said alkylation step.

2. An improved process for reacting isobutane with butylenes, which comprises intimately admixing as liquids and at about atmospheric temperature, in a pretreatment step, isobutane and only used hydrofluoric acid separated from effluents of a subsequent alkylation step, maintaining said admixture for at least about 25 minutes and between about 5 and 10 times as long as the reaction time of said subsequent alkylation step, passing about one-third of the total unseparated effluents of said pretreatment to said alkylation step and the remainder of said effluents to a separator and separating a liquid hydrocarbon phase from a liquid hydrofluoric acid phase, passing said hydrocarbon phase to said alkylation step, passing a major portion of said hydrofluoric acid phase to said pretreatment and discharging from the process a minor portion of said hydrofluoric acid phase, passing to said alkylation step a butylene-containing hydrocarbon material and maintaining alkylation conditions to effect an alkylation reaction between butylenes and isobutane in the presence of hydrofluoric acid as the catalyst, separating from effluents of said alkylation step a hydrocarbon phase and a hydrofluoric acid phase, passing at least a major portion of said hydrofluoric acid phase to said pretreatment step, the time-lapse between said separation and introduction of said acid into said pretreatment step being not greater than 5 minutes, and recovering from said hydrocarbon phase an alkylate fraction so produced.

MARYAN P. MATUSZAK.